3,007,920
NEW 6-AMINOPENICILLANIC ACID DERIVATIVES

Hubert Vanderhaeghe, Saint-Gilles-Brussels, Michel Claesen, Heverlee, and Paul Van Dijck and Guido Parmentier, Louvain, Belgium, assignors to Recherche et Industrie Therapeutiques, en abrégé R.I.T., Genval, Belgium, a corporation of Belgium
No Drawing. Filed Feb. 20, 1961, Ser. No. 90,243
Claims priority, application Great Britain Oct. 28, 1960
3 Claims. (Cl. 260—239.1)

This invention relates to a novel class of antimicrobial agents. More specifically, our invention pertains to novel derivatives of 6-aminopenicillanic acid which possesss new and unexpected antimicrobial and physiological properties.

In particular, the compounds of our invention may be represented by the following structural formula:

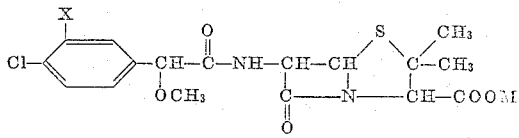

wherein X represents chloro or hydrogen, and M represents hydrogen or pharmaceutically acceptable cations.

We have discovered that compounds in this class demonstrate an antimicrobial activity comparable to penicillin V and phenethicillin. In addition these compounds demonstrate certain improved physiological properties. In particular, our compound exhibits prolonged serum levels with increased anti-infective titers as compared with penicillin V or phenethicillin. Thus not only do these compounds manifest a greater anti-infective activity against those organisms susceptible to penicillin V, penicillin G and phenethicillin such as Streptococcus and Pneumococcus, but in addition exhibit this activity for a greater length of time.

Furthermore the compounds of this invention exhibit the unexpected and highly desirable features of rapid oral absorption and resistance to degradation within the infected animal's body. Hence, not only are our compounds effective when administered via the oral route, but in addition are largely excreted in a non-degradated form. This property is manifested by the presence of a high concentration of the compounds in the urine of the animals. Thus, approximately 60% of an orally administered dose of our compounds can be shown to be present in the urine of the treated animal six hours after administration whereas only some 25% of penicillin V can be shown to be present under similar circumstances. By virtue of this property, the compounds of our invention are highly valuable for specific treatment of various infections of the kidneys and urogenital tract, as for example, cystitis, prostatitis, pyelitis and miscellaneous other infections of the urinary tract. The compounds of our invention may be administered alone or in conjunction with other therapeutic agents, such as for example, sulfisoxazole, sulfamethiazole, methenamine mandelate, phenylazodiaminopyridine, chloromycetin, nitrofurantoin, and the like.

While more preferably administered via the oral route, our compounds are also suitable for injection or topical application. They may be administered in any of the usual pharmaceutical forms such as tablets, capsules, powders, suspension, solution, suppositories and the like.

In general, the compounds of our invention may be prepared by treating 6-aminopenicillanic acid with the appropriately chlorinated α-methoxyphenylacetyl chloride or alternatively by treating 6-aminopenicillanic acid with a mixed anhydride of the chlorinated α-methoxyphenylacetic acid. These reactions may be represented as follows:

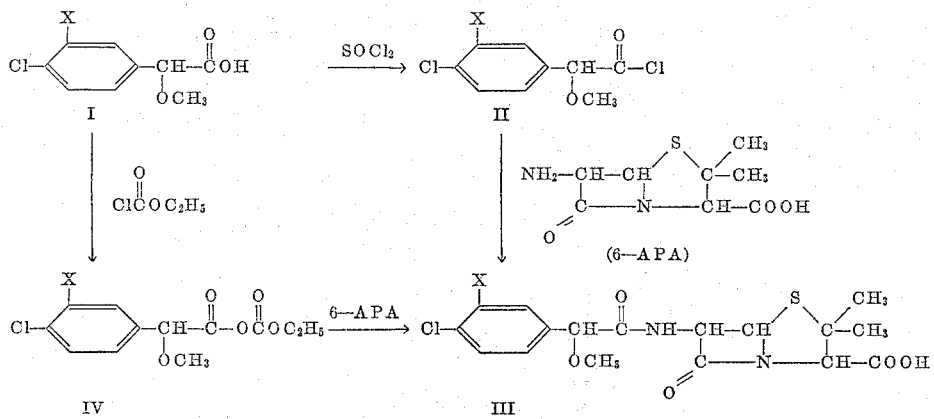

The compounds of our invention contain an asymmetrical carbon atom in the chlorinated α-methoxyphenylacetic fragment of their formulas; the epimers may be obtained either by optical resolution or by using optically active starting material.

Also included in the scope of our invention are the pharmaceutically acceptable salts of our novel compounds such as the metal salts as for example the sodium, potassium and calcium salts and amine salts such as the triethylamine, procaine, n-ethylpiperidine, and the like salts.

The following examples will serve to further typify the nature of our invention but should not be construed as limiting the scope thereof, the scope being defined only by the appended claims.

Example 1

6-aminopenicillanic acid (2.16 g.) is dissolved in 20 ml. of a one molar aqueous solution of potassium bicarbonate and 10 ml. of acetone. The resultant solution is cooled in an ice-water bath and to it is added with stirring a solution of 2.7 g. of α-methoxy-3,4-dichlorophenylacetyl chloride in 10 ml. of acetone. The pH is adjusted to 7–8 and upon completion of the addition the reaction medium is stirred for 15 minutes at ice bath temperature and then for 2½ hours at room temperature, maintaining the pH range between 7 and 8. The solution is extracted once with ether and then adjusted to pH 2.5 with 20% phosphoric acid. The acidic solution is extracted once with 30 ml. of butyl acetate and again with 10 ml. of butyl acetate. These combined butyl acetate extracts are thereafter successively washed twice with water and re-extracted at pH 7 with 0.5 N aqueous potassium hydroxide solution. The aqueous layer is washed twice with ether and the remaining organic solvent is then removed by evaporation under reduced pressure.

The washed aqueous layer is then lyophilized and the residue thus obtained taken up in acetone. The crystalline product is collected by filtration and dried to yield the potassium salt of 6-(α-methoxy-3,4-dichlorophenylacetamido)-penicillanic acid.

Upon treatment with mineral acid of an aqueous solution of the compound so prepared, there is obtained the free acid, 6-(α-methoxy-3,4-dichlorophenylacetamido)-penicillanic acid.

*Example 2*

A solution of 19.2 g. (0.096 mole) of α-methoxy-4-chlorophenyl acetic acid in 200 ml. of acetone is cooled in an ice bath to 0°. To the cooled solution is added 10.2 g. (0.1 mole) of triethylamine in 100 ml. of acetone. The temperature of the reaction mixture is maintained at 10° and a solution of 11 g. (0.1 mole) of ethylchloroformate in 45 ml. of acetone is added dropwise with agitation so as to maintain a final reaction temperature of −5°. To this mixture is then slowly added with stirring a solution of 23.8 g. (0.11 mole) of 6-aminopenicillanic acid in 40 ml. of water and 15 ml. of triethylamine. Upon completion of the addition, the mixture is stirred while attaining room temperature and then stirred for an additional one-half hour. The mixture is extracted with three portions of 300 ml. of ether and the resulting aqueous solution adjusted to pH 2.0 with 6 N sulfuric acid, maintaining a temperature of less than 10°. At pH 2, the solution is extracted with 250 ml. of butyl acetate and then extracted twice with 75 ml. each of butyl acetate. To the combined butyl acetate extracts are added 250 ml. of water and the pH adjusted to 8.0 by the addition of sodium bicarbonate. The layers are separated and the aqueous layer adjusted to 2.0 by the addition of 6 N sulfuric acid at less than 10° C. This acid aqueous mixture is next extracted with 200 ml. of butyl acetate and the organic extract extracted once with water and dried over sodium sulfate. To the butyl acetate solution is added with vigorous stirring a solution of potassium hydroxide in n-butanol (40 g./l.) until the pH of the reaction mixture is 8.4. The mixture is then cooled until crystallization occurs. The crystals are collected by centrifugation, washed with a small amount of acetone and dried. These dried crystals are recrystallized from butanol and re-dried to yield 6-(α-methoxy-4-chlorophenylacetamido)-penicillanic acid as the potassium salt.

Treatment with acid as described in Example 1 then yields the corresponding free acid 6-(α-methoxy-4-chlorophenylacetamido)-penicillanic acid.

Alternatively α-methoxy-4-chlorophenyl acetic acid is treated with thionyl chloride to form the corresponding acid chloride, which when substituted for α-methoxy-3,4-dichlorophenyl acetic acid to the procedure of Example 1, yields the compound 6-(α-methoxy-4-chlorophenylacetamido)-penicillanic acid.

*Example 3*

One gram of 6-(α-methoxy-3,4-dichlorophenylacetamido)-penicillanic acid is dissolved in excess amyl acetate and to this solution is added 0.260 g. of N-ethylpiperidine. The solution is stirred for 30 minutes and the crystals formed upon standing are collected by filtration and dried to yield the N-ethylpiperidine salt of 6-(α-methoxy-3,4-dichlorophenylacetamido)-penicillanic acid.

*Example 4*

One gram of 6-(α-methoxy-4-chlorophenylacetamido)-penicillanic acid is dissolved in excess amyl acetate and to this solution is added 0.250 g. of triethylamine. The solution is stirred for 30 minutes and the crystals formed upon standing are collected by filtration and dried to yield the triethylamine salt of 6-(α-methoxy-4-chlorophenylacetamido)-penicillanic acid.

We claim:

1. A compound selected from the group consisting of acids having the formula:

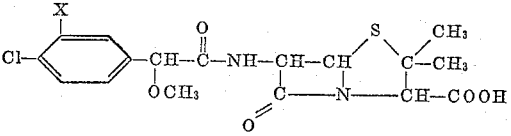

wherein X is a member selected from the group consisting of hydrogen and chloro, and the sodium, potassium, calcium, and pharmaceutically acceptable non-toxic amine salts thereof..

2. A compound having the formula:

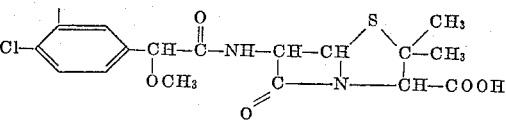

3. A compound having the formula:

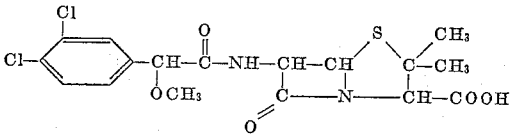

References Cited in the file of this patent

UNITED STATES PATENTS 2,941,995     Doyle et al. _____ June 21, 1960

FOREIGN PATENTS 569,728     Belgium _____ Nov. 15, 1958